US012072491B2

(12) United States Patent
Jacobsen

(10) Patent No.: US 12,072,491 B2
(45) Date of Patent: Aug. 27, 2024

(54) HEAD-MOUNTED DISPLAY SYSTEM

(71) Applicant: Kopin Corporation, Westborough, MA (US)

(72) Inventor: Jeffrey J. Jacobsen, Hollister, CA (US)

(73) Assignee: Kopin Corporation, Westborough, MA (US)

( * ) Notice: Subject to any disclaimer, the term of this patent is extended or adjusted under 35 U.S.C. 154(b) by 126 days.

(21) Appl. No.: 16/425,088

(22) Filed: May 29, 2019

(65) Prior Publication Data

US 2019/0369400 A1 Dec. 5, 2019

Related U.S. Application Data

(60) Provisional application No. 62/677,624, filed on May 29, 2018.

(51) Int. Cl.
*G02B 27/01* (2006.01)

(52) U.S. Cl.
CPC ..... *G02B 27/0172* (2013.01); *G02B 27/0101* (2013.01); *G02B 27/0149* (2013.01); *G02B 27/0176* (2013.01); *G02B 2027/014* (2013.01); *G02B 2027/0192* (2013.01)

(58) Field of Classification Search
CPC ............ G02B 27/0172; G02B 27/0101; G02B 27/0149; G02B 27/0176; G06F 1/163; G06F 1/167; H04N 7/15; H04N 7/147
See application file for complete search history.

(56) References Cited

U.S. PATENT DOCUMENTS

| 10,432,892 | B1 * | 10/2019 | Tamayo | H04N 7/15 |
| 10,447,968 | B1 * | 10/2019 | Passe | H04N 7/147 |
| 10,620,779 | B2 * | 4/2020 | Hastings | G06F 3/0484 |
| 2015/0340010 | A1 * | 11/2015 | Travers | G06F 1/163 |
| | | | | 345/520 |
| 2017/0113143 | A1 * | 4/2017 | Marr | A63F 13/355 |
| 2018/0338109 | A1 * | 11/2018 | Badr | H04N 1/2187 |
| 2020/0394012 | A1 * | 12/2020 | Wright, Jr. | G06F 3/167 |

* cited by examiner

*Primary Examiner* — Fred Tzeng
(74) *Attorney, Agent, or Firm* — Hamilton, Brook, Smith & Reynolds, P.C.

(57) ABSTRACT

A headset display system may comprise a head mounted display and a remote host device. The head mounted display may comprise a microdisplay and sensing components. The remote host device may communicate with the head mounted display, and formulate a task requirement based on information associated with a user of the headset display system. The remote host device may further search for and identify one or more wireless resources currently available to the remote host device, determine which of the identified wireless resources are suitable for satisfying the task requirement, and utilize the determined wireless resources to accomplish a task corresponding to the task requirement. The wireless resources may comprise at least one entity, external to the headset display system, that (i) generates a physical informational parameter, (ii) generates a process result, (iii) performs a data processing task, and/or (iv) accesses a communication and/or information storage resource.

20 Claims, 10 Drawing Sheets

HEAD-MOUNTED DISPLAY SYSTEM

RELATED APPLICATION

This application claims the benefit of U.S. Provisional Application No. 62/677,624, filed on May 29, 2018. The entire teachings of the above application are incorporated herein by reference.

BACKGROUND

Mobile computing devices, such as notebook PC's, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices

SUMMARY

The embodiments described herein relate to a wearable headset system (WHS) configured to cooperate with a host device (e.g., a mobile cellular communication device) to provide the user with a hands-free computing and communications interface experience. The wearable headset system may comprise various sensor components (e.g., camera, GPS receiver, accelerometer/gyroscope and other gesture control components, etc.) configured to gather and generate sensed information. The wearable headset system may also comprise various user I/O components (e.g., micro-display, microphones, speakers/earphones, speech recognition, noise cancellation, wired and wireless transceiver components, etc.). The wearable headset system may be used with a host device, for example but not limited to smart phones, tablets, notebooks or another mobile device to achieve a true user Hands-Free mobile computing/communication interface providing the user with a noise cancelled (Voice Extraction) user speech and head tracked gesture interface.

Micro-displays (also referred to as microdisplays) can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear. A "wireless computing headset" device includes one or more small high-resolution micro-displays and optics to magnify the image. The WVGA micro-displays can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility through hands dependent devices.

The embodiments of a WHS described herein may be used with a host device (also referred to herein as mobile computing device or mobile device), for example but not limited to smart phones, tablets, notebooks or another mobile device to achieve a true user Hands-Free mobile computing/communication interface providing the user with a noise cancelled (Voice Extraction) user speech and head tracked gesture interface. FIG. 1A illustrates a user wearing an WHS 102, connected through a high bandwidth interface 104 to a host device 106. FIG. 1B shows the WHS 102, the high bandwidth interface 104 and the host device 106 apart from a user.

Embodiments of the WHS may receive audio data and visual data from the host mobile computing device 106 (smart phone, tablet, notebook or other mobile device), to which the WHS is connected, through the high bandwidth interface 104. As used herein, "audio data" is information that represents or otherwise relates to audible sound. As used herein, "visual data" is information that represents or otherwise relates to viewable manifestations, including but not limited to viewable manifestations based on still image media, moving image media, image overlay information, or image annotation information.

Audio data and visual data delivered to the WHS over the high bandwidth interface is pre-processed and formatted, as the WHS requires, by the host mobile device to which the WHS is connected. The audio data and visual data sent from the host device to the WHS is essentially presentation-ready, requiring very little or no data processing by the WHS. The host mobile device may perform some or all of the necessary image processing and audio processing prior to sending the audio or visual data to the WHS over the high bandwidth interface.

In one aspect, the invention may be a headset display system, comprising a head mounted display and a remote host device. The head mounted display may comprise a microdisplay and one or more sensing components. The remote host device may be configured to communicate with the head mounted display. The remote host device may comprise a processor and a memory with computer code instructions stored thereon. The memory may be operatively coupled to the processor such that, when executed by the processor, the computer code instructions cause the headset display system to formulate a task requirement based on information associated with a user of the headset display system, and to search for and identify one or more wireless resources currently available to the remote host device. The computer code instructions may further cause the headset display system to determine which of the identified one or more wireless resources are suitable for satisfying the task requirement, and to utilize the determined one or more wireless resources to accomplish a task corresponding to the task requirement.

The information associated with the user may comprise information associated with one or more actions performed by the user. The one or more wireless resources may comprise at least one entity, external to the headset display system, that performs at least one of (i) generate a physical informational parameter, (ii) generate a process result, (iii) perform a data processing task, and/or (iv) access a communication and/or information storage resource.

The physical information parameter may comprise one or more of (i) geo-location information, (ii) temperature information, (iii) weather condition information, (iv) time of day information, (v) seasonal conditions, and (vi) traffic condition information. The process result, and/or a result of the data processing, may comprise one or more of (i) dictation, (ii) speech to text conversion, (iii) text to speech conversion, and (iv) language translation.

The computer code instructions may further cause the headset display system to implement combining two or more of the physical information parameter, process result and/or a result of the data processing task.

The determining may be independent of other activities being undertaken by the user. The determining may depend on other activities being undertaken by the user.

The computer code instructions may further cause the headset display system to implement a virtual video conferencing facility that presents video and audio information concerning one or more remote parties, to the user of the headset display system. The virtual video conferencing facility may be configured to facilitate annotations.

In another aspect, the invention may be a method of identifying and utilizing external resources. The method may be performed by a processor and a memory with computer code instructions stored thereon, the memory operatively coupled to the processor. When executed by the processor, the computer code instructions may cause a headset display system to implement (i) formulating a task requirement based on information associated with a user of the headset display system, (ii) searching for and identifying one or more wireless resources currently available to the headset display system, (iii) determining which of the identified one or more wireless resources are suitable for satisfying the task requirement, and (iv) utilizing the determined one or more wireless resources to accomplish a task corresponding to the task requirement.

The information associated with the user may comprise information associated with one or more actions performed by the user. The one or more wireless resources may comprise at least one entity, external to the headset display system, that performs at least one of (i) generate a physical informational parameter, (ii) generate a process result, (iii) perform a data processing task, and/or (iv) access a communication and/or information storage resource.

The method may further comprise combining two or more of the physical information parameter, process result and/or a result of the data processing task. The determining may be independent of other activities being undertaken by the user. The determining may depend on other activities being undertaken by the user.

The method may further comprise implementing a virtual video conferencing facility that presents video and audio information concerning one or more remote parties, to the user of the headset display system. The virtual video conferencing facility may be configured to facilitate annotations.

In another aspect, the invention may be a headset display system, comprising a head mounted display and a remote host device. The head mounted display may comprise a microdisplay and one or more sensing components. The remote host device may be configured to communicate with the head mounted display. The remote host device may comprise a processor and a memory with computer code instructions stored thereon. The computer code instructions may be generated by using a software development kit (SDK) facility associated with an operating system employed by the remote host device, and arranging the SDK to cooperate with an SDK plugin. The SDK plugin may be configured to facilitate access to at least one resource.

The at least one resource may comprise at least one entity, external to the headset display system, that performs at least one of (i) generate a physical informational parameter, (ii) generate a process result, (iii) perform a data processing task, and/or (iv) access a communication and/or information storage resource.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The described embodiments of an WHS may provide a wearable, high resolution microdisplay element (for example, WVGA or higher resolution display formats) supported in a near eye optic configuration, within a user adjustable display module. The WHS comprises a head mounted display device, a host device, and a connection coupling the head mounted display device and the host device and providing a communication path. In the described embodiments, the connection is shown as a wired connection, although in other embodiments the connection may be wireless.

Figure 2A:
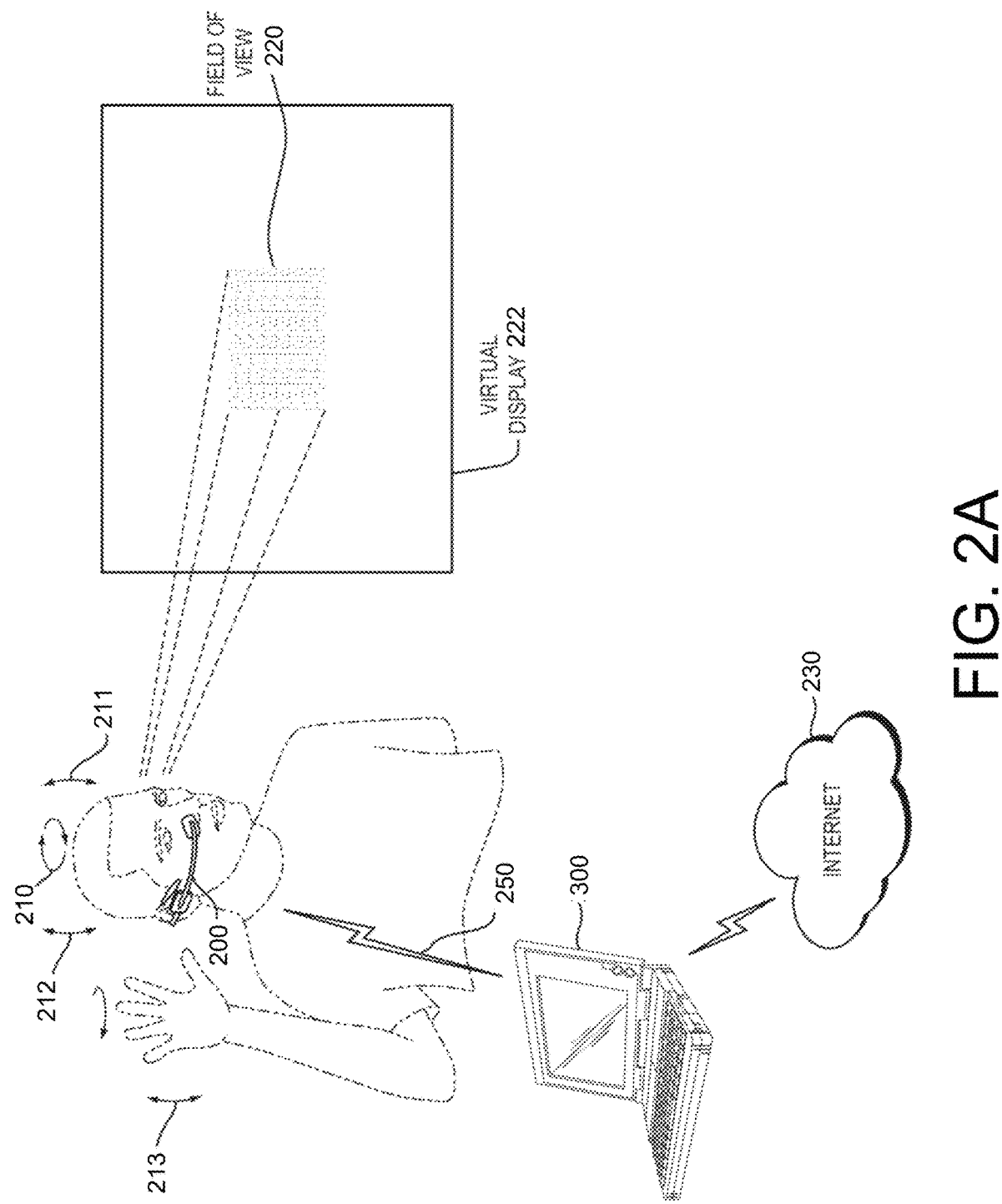
FIGS. 2A and 2B show an example embodiment of a HMD, according to the invention.
Figure 2B:
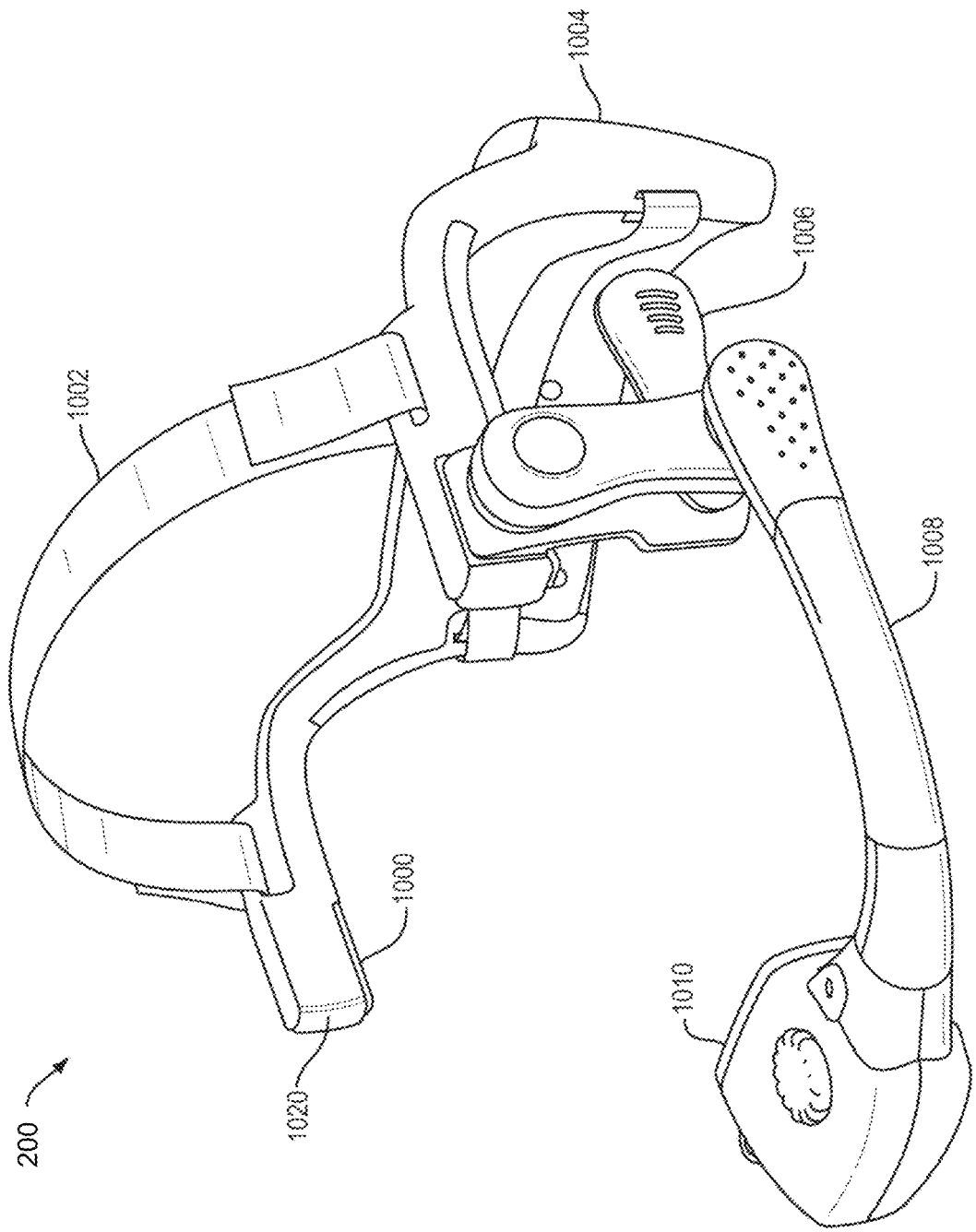

FIGS. 2A and 2B show an example embodiment of a wireless headset device 200 (also referred to herein as a head mounted display (HMD) or headset computer (HSC)) that incorporates a high-resolution (VGA or better) micro-display element 1010, and other features described below. HMD 200 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (shown in FIG. 2B). Typically located within the housing of HMD 200 may be various electronic circuits including, for example, a microcomputer (single or multi-core processors), one or more wired and/or wireless communications interfaces, memory or storage devices, various sensors and a peripheral mount or mount, such as a "hot shoe." In some embodiments, the HMD 200 may not include a microcomputer, or may include a computing device with relatively low processing power, relying instead on the associated host device for computing services.

Example embodiments of the HMD 200 can receive user input through sensing voice commands, head movements, 210, 211, 212 and hand gestures 213, or any combination thereof. Microphone(s) operatively coupled or preferably integrated into the HMD 200 can be used to capture speech commands which are then digitized and processed using automatic speech recognition techniques. Gyroscopes, accelerometers, and other micro-electromechanical system sensors can be integrated into the HMD 200 and used to track the user's head movement 210, 211, 212 to provide user input commands. Cameras or other motion tracking sensors can be used to monitor a user's hand gestures 213 for user input commands. Such a user interface overcomes the hands-dependent formats of other mobile devices.

The HMD 200 can be used in various ways. It can be used as a remote display for streaming video signals received from a remote host computing device 300 (shown in FIG. 2A). The host 300 may be, for example, a notebook PC, smart phone, tablet device, or other computing device having less or greater computational complexity than the wireless HMD 100, such as cloud-based network resources. The host 300 may be further connected to other networks 230, such as the Internet. The HMD 100 and host 300 can wirelessly communicate via one or more wireless protocols, such as Bluetooth, Wi-Fi, WiMAX, 4G LTE, or other wireless interface 250. In an example embodiment, the host 300 may be further connected to other networks, such as through a wireless connection to the Internet or other cloud-based network resources, so that the host 300 can act as a wireless relay. Alternatively, some example embodiments of the HMD 200 can wirelessly connect to the Internet and cloud-based network resources without the use of a host wireless relay.

FIG. 2B is a perspective view showing some details of an example embodiment of a HMD 100. The example embodiment HMD 200 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the HMD 200 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the micro-display subassembly 1010 and the control circuitry housed within housing unit 1004.

According to aspects that will be explained in more detail below, the HMD 200 allows a user to select a field of view 220 within a much larger area defined by a virtual display 222. The user can typically control the position, extent (e.g., X-Y or 3D range), and/or magnification of the field of view 220.

While what is shown in FIG. 2A and FIG. 2B is a monocular micro-display presenting a single fixed display element supported on the face of the user with a cantilevered boom, it should be understood that other mechanical configurations for the HMD 200 are possible.

Figure 3:
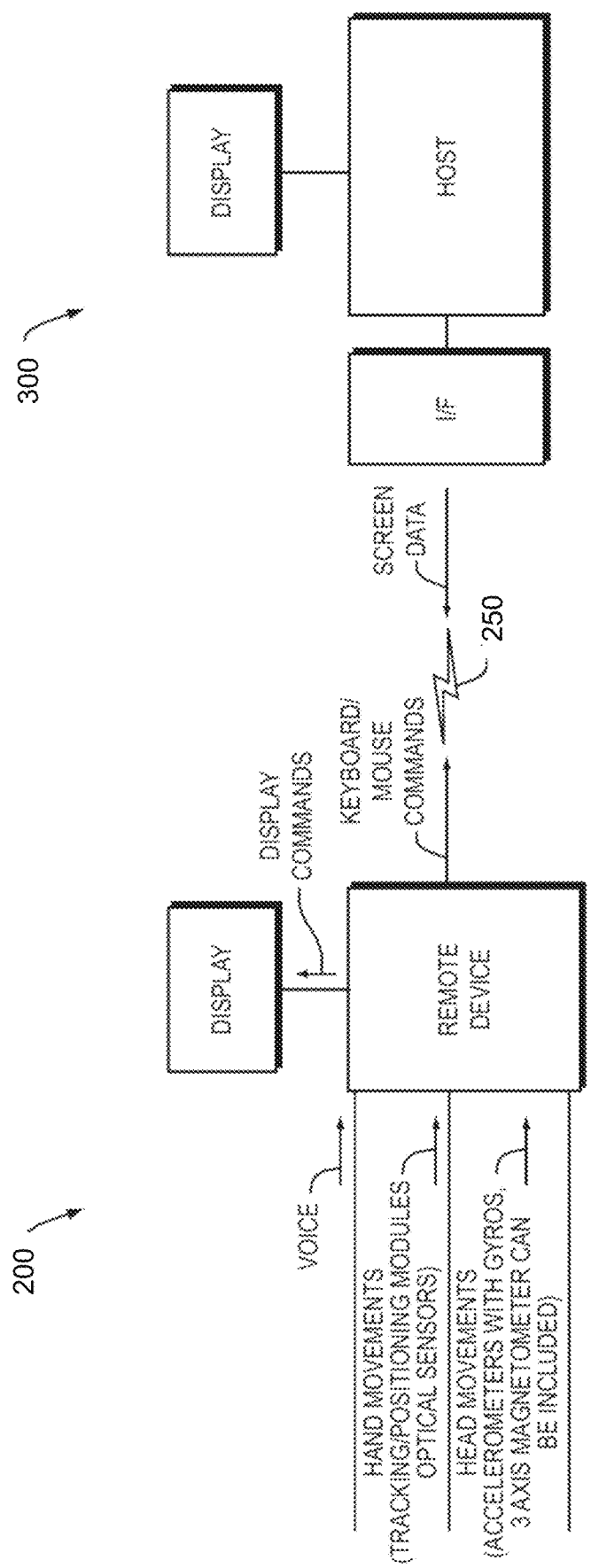
FIG. 3 shows the HMD, host and the data that travels between them, according to the invention.

FIG. 3 is a block diagram showing more detail of the HMD 200, host 300 and the data that travels between them. The HMD 200 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (e.g., executed by one or more processors) in the HMD 200 into keyboard and/or mouse commands that are then sent over the Bluetooth or other wireless interface 250 to the host 300. The host 300 then interprets these translated commands in accordance with its operating system/application software to perform various functions. Among the commands is one to select a field of view 220 within the virtual display 222 and return that selected screen data to the HMD 200. Thus, it should be understood that a very large format virtual display area might be associated with application software or an operating system running on the host 300. However, only a portion of that large virtual display area 222 within the field of view 220 may be returned to and actually displayed by the micro display 1010 of HSC or HMD device 200.

In this sense therefore, the amount of data to be transmitted over the wireless interface 250 may be small. For example, data transmitted over the wireless interface may simply include instructions on how to lay out a screen, which text to display, stylistic information such as drawing arrows, background colors, or which images to include.

Additional data could be streamed over the same wireless interface 250 or another connection and displayed on screen 1010, such as a video stream if required by the host 300.

Figure 4:
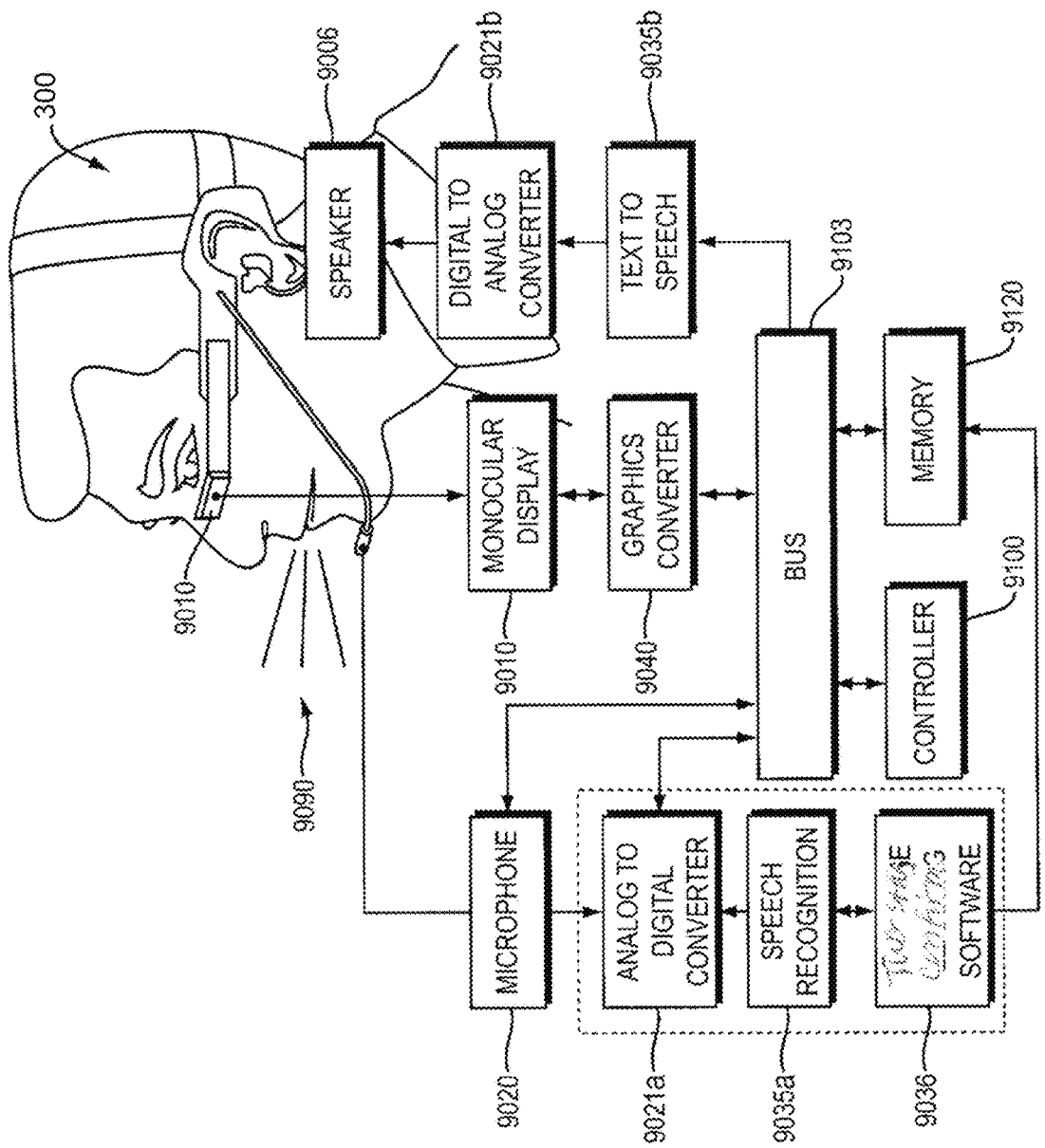
FIG. 4 shows an exemplary HMD under voice command, according to the invention.

FIG. 4 depicts an example non-limiting wireless hands-free video headset (i.e., HMD) 200 under voice command. The user can be presented with an image on the micro-display 9010, for example, as output by host 300. An HMD-equipped user can use speech-to-text software module 9036, either locally or from a remote host 300, in which the user is presented with an image of a message box, text box or dialogue box requesting user input on the micro-display 9010 and the audio of the same through the speaker 9006 of the HMD 200. Because the HMD 200 is also equipped with a microphone 9020, the user can utter the subject command selection.

The schematic diagram of FIG. 4 illustrates some of the modules of the example HMD 200. FIG. 4 includes a schematic diagram of the operative modules of the HMD 200. For the case of speech recognition processing, controller 9100 accesses speech-to-text module 9036, which can be located locally to each HMD 200 or located remotely at a host 300 (FIG. 2A). Speech-to-text software module 9036 contains instructions to display to a user an image of processed text (e.g. dictation transcription) and menus (or navigation and other prompts). The graphics converter module 9040 converts the image instructions received from the module 9036 via bus 9103 and converts the instructions into graphics to display on the monocular display 9010. At the same time text-to-speech module 9035b converts instructions received from speech-to-text software module 9036 to create sounds representing the contents for the image to be displayed. The instructions are converted into digital sounds representing the corresponding image contents that the text-to-speech module 9035*b* feeds to the digital-to-analog converter 9021*b*, which in turn feeds speaker 9006 to present the audio to the user. Speech processing software module 9036 can be stored locally at memory 9120 or remotely at a host 300 (FIG. 2A). The user can speak/utter dictation and/or command selection and the user's speech 9090 is received at microphone 9020. The received speech is then converted from an analog signal into a digital signal at analog-to-digital converter 9021*a*. Once the speech is converted from an analog to a digital signal speech recognition module 9035*a* processes the speech into recognized speech. The recognized speech is compared against known speech and processed into text according to instructions of speech-to-text module 9036.

HMD 200 further includes a transceiver module 9140 coupled to bus 9130 and wireless interface 250. The transceiver module may be connected to the controller 9100 or other processors within the HMD 200 through bus 9130 or directly. The transceiver module 9140 includes a receiver 9142 for receiving information from the wireless interface 250 and a transmitter 9144 for transmitting information to the wireless interface 250.

In an exemplary embodiment, the HMD 200 may incorporate operating system (OS) software that is stored as executable code in the HMD memory 9120 and executed by the controller 9100 (also referred to herein as a "processor"). An example of such an operating system is the Golden-i operating system (Gi-OS). The OS may include a document viewer component that provides a user of the HMD 200 with features such as zoom level controls, head-tracker control to pan around the document and the ability to freeze the document at a certain location.

The example HMD 200 may further include a remote annotation utility that cooperates with the document viewer. The remote annotation utility may be software stored as executable code in memory 9120 and executed by controller 9100. Remote documents and/or annotations are sent as messages to the HMD 200 from secondary devices.

The cooperation between the OS document viewer component and the remote annotation utility gives the user of the HMD 200 access to all of the features of the document viewer while the user of the HMD 200 reviews documents and/or annotations from the remote user. The user of the HMD 200 consequently has very little to think about in order to see and control the document and/or annotations that are sent from the remote user.

The following embodiments are directed to one or more aspects of the wearable headset system and/or one or more of its associated cooperating components.

Figure 5A:
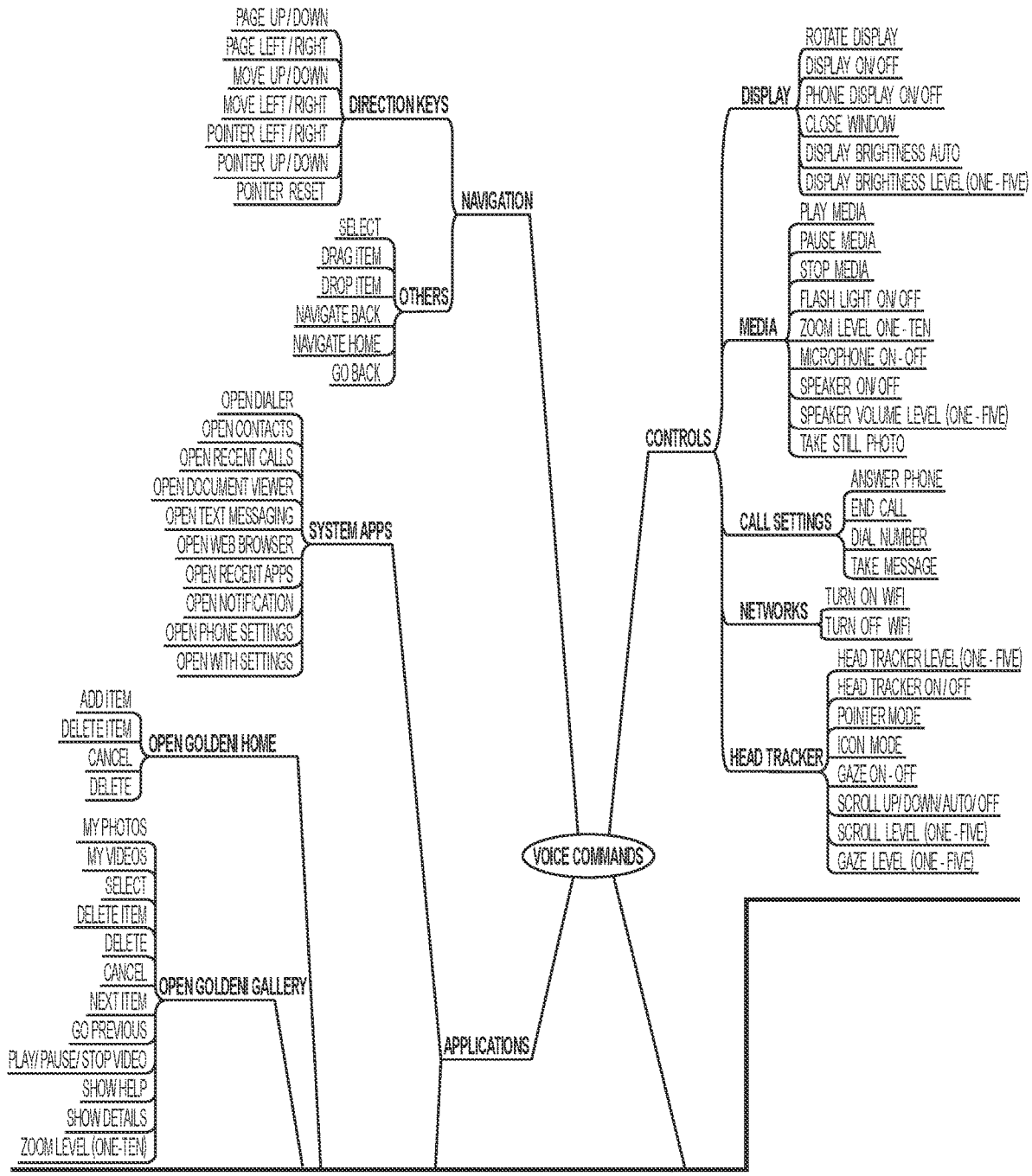
FIGS. 5A and 5B show an example spoken command set according to the invention.
Figure 5B:
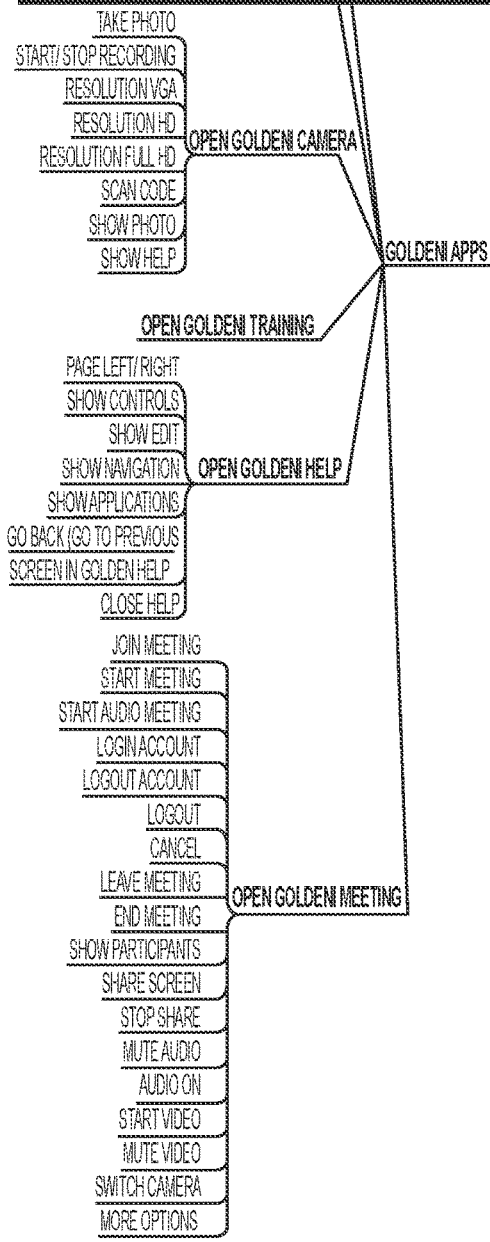
Figure 5B:
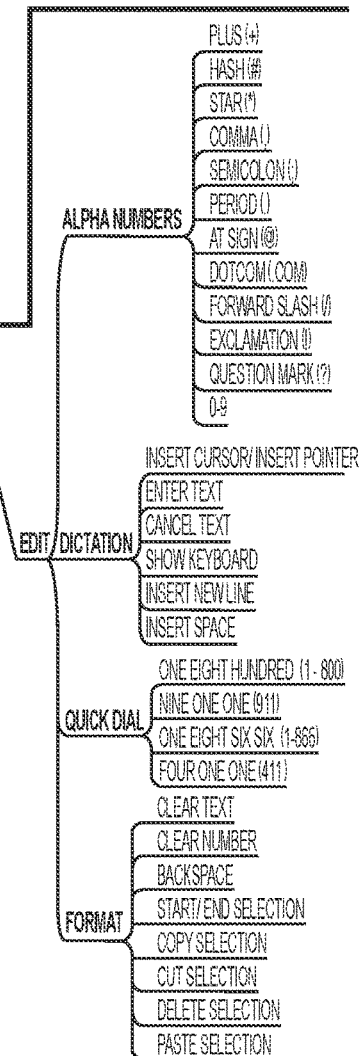

The wearable headset system may facilitate hands free control of various aspects of the system through a set of spoken commands. The specific architecture of the spoken command set, an example of which is presented in FIGS. 5A and 5B, allows a user of the headset system to quickly and efficiently manipulate the display, utility applications and setup facilities of the headset system.

One aspect of hands-free control facilitated by the wearable headset system may be a head-tracked cursor. A user's head gestures (e.g., tilt forward/backward/side-to-side, rotate left/right, etc.) may be determined by evaluating the outputs of one or more motion sensors (e.g., gyroscopes and/or accelerometers). A cursor's position on a graphical user interface (GUI), displayed on the microdisplay of the headset, may be positioned and/or moved within the user's field of view as a function of the sensed head gesture(s). Thus, the movement of a cursor, as typically performed based on the physical movement of a human input device (HID; e.g., a mouse), may be performed hands-free using head gestures.

The head gesture or gestures may be augmented with one or more voice commands to implement actions typically performed by actuating buttons, switches, or other control mechanisms on the mouse or other human input device. For example, a voice command of "select" may be used to implement the selection of a displayed item, associated with a cursor position on the graphical user interface (GUI), which would otherwise be done by "clicking" a mouse button.

Accordingly, legacy software that has been designed to operate with a human input device, such as a mouse, may be seamlessly operated using the voice-augmented gesture controlled interface of the described embodiments in place of the mouse.

For certain implementations of the wearable headset system, the size of the user's field of view (FOV) within the microdisplay may be quite large. Using head gestures alone to move a cursor to a specific location within the microdisplay may be tedious and time consuming, given such a large FOV.

In one embodiment, a user may establish the location of the cursor, at a desired location within the user's FOV, by uttering a voice command. The voice command may identify a predetermined location (e.g., "top right quadrant"), or the voice command may include navigation information associated with the desired placement (e.g., "move right by 75 percent of the display width and up by 33 percent of the display height"). Such voice-only placement of the cursor may serve to minimize (or at least reduce) the required head tracked cursor movement. Further, a spoken command (e.g., "Select") may be used as an equivalent of a button push or screen tap activation of an executable object. The described embodiments may minimize (or at least reduce) head tracked movement for final cursor placement to activate screen executable or screen button.

Legacy applications may provide the ability to scroll through pages of content, for example by manipulating "scroll bars" within the GUI using a human input device (HID; e.g., a handheld mouse). Embodiments of the wearable headset system may provide a scroll mode, which facilitates hands-free use of such scrolling features. In one embodiment, a user may utter a command (e.g., "begin scrolling") to enter the scroll mode, and utter a different voice command (e.g., "end scrolling") to exit the scrolling mode. The user may incline or decline his/her head (i.e., nod up or down) to control the scrolling direction. For example, inclining the user's head may cause the GUI display to scroll up, while declining the user's head causes GUI display to scroll down.

The amount of inclination or declination may control the scrolling speed. For example, a slight inclination may cause the up-scrolling to progress slowly, while increasing the inclination may cause the up-scrolling to progress more rapidly. A spoken command or other information entry mechanism may be used to change the sensitivity level of the scrolling. In an example embodiment, ten scroll levels may be available. A lower scrolling level (e.g., level 1 or 2) may provide low sensitivity, such that the full range of head declination or inclination may only change the scrolling speed by a small amount. A higher scrolling level (e.g., scrolling level 9 or 10) may provide higher sensitivity, such that a slight change in head inclination or declination may cause a substantial change to the scrolling rate. A voice command (e.g., "normalize scrolling" or "reset scrolling") uttered by the user may cause the wearable headset system to return the scrolling sensitivity to a predetermined default scrolling rate.

Generally, a user of the wearable headset system may enter information into a GUI field of an associated display or microdisplay through voice input, i.e., by uttering words or individual alpha-numeric elements (i.e., letters and/or numbers). In certain circumstances, however, a user may not wish to voice the information such that others may hear. In such circumstances, embodiments may provide a "gaze mode," which may facilitate a user's silent entry of information. An example embodiment may allow a user to enable and disable the gaze mode through voice command, menu selection or other such technique known in the art.

In an example gaze mode embodiment, the user may be presented with an image of an alpha-numeric keyboard within the display/microdisplay field of view. By performing head gestures, the user may cause a cursor or other pointing mechanism, presented on the display/microdisplay, to interact with the keyboard image. The user may cause the cursor/pointer to overlap an alpha-numeric element of the keyboard for a predetermined amount of time (referred to herein as "dwell time"). Once the user causes the cursor/pointer to remain on the alpha-numeric element for the predetermined dwell time, the alpha-numeric element may be selected and entered into the GUI field. The predetermined dwell time (also referred to herein as "gaze time") may be adjusted by the user. In an example embodiment, the dwell time may be quantized according to gaze levels, and the user may select a specific gaze level through voice command, menu selection or other such technique known in the art. For example, an embodiment may provide gaze levels 1-5, where gaze level 1 exhibits a 0.5 second dwell time, gaze level 5 provides a 3 second dwell time, and gaze levels 2 through 4 provide dwell times between 0.5 and 3 seconds.

Embodiments of a wearable headset system may provide a hands-free pointer mode that enables a user to precisely select objects within the user's field of view in the display and/or microdisplay. The wearable headset system may interpret the user's head movements to manipulate a pointer within the user's field of view. The user may select pointer size and/or pointer shape through voice command, menu selection or other such technique known in the art. Example pointer shapes may include arrow, circle, cross hair, gun sight, among others.

A spoken command or other information entry mechanism may be used to change the sensitivity level of the hands-free pointer movement. In an example embodiment, ten motion sensitivity levels may be available. A lower motion sensitivity level (e.g., level 1 or 2) may provide low sensitivity, such that the full range of head movement (e.g., left to right or forward to back) may only cause the pointer to move by a small amount. A higher motion sensitivity level (e.g., pointer mode level 9 or 10) may provide higher sensitivity, such that a slight change in head movement may cause a substantial change to the position of the pointer. A voice command (e.g., "reset pointer" or "pointer reset") uttered by the user may cause the wearable headset system to return the pointer motion sensitivity to a predetermined default pointer movement sensitivity.

As for Voice-Based Cursor Control described herein, the pointer mode may allow a user to establish the location of the pointer, at a desired location within the user's FOV, by uttering a voice command. The voice command may identify a predetermined location (e.g., "top right quadrant"), or the voice command may include navigation information associated with the desired placement (e.g., "pointer right by 75 percent of the display width and up by 33 percent of the display height"). Such voice-only placement of the pointer may serve to minimize head movement (or at least reduce) the required head tracked cursor movement. Further, a spoken command (e.g., "Select") may be used as an equivalent of a button push or screen tap activation of an executable object. Alternatively, the dwell time selection as described herein with the gaze mode may be used instead of or in addition to a spoken command to select a displayed object in association with the pointer. The described embodiments may minimize (or at least reduce) head tracked movement for final HID cursor placement to activate screen executable or screen button.

Instead of or in addition to the pointer mode described herein, embodiments of the wearable headset system may include an icon mode. The icon mode allows the user of the wearable headset system to make a hands-free selection of a displayed executable icon or other object instantiated in the user's FOV. Icon Mode Head-tracked movement moves a highlighted border from icon to icon or from executable to executable on a on a display screen, with or without spoken command augmentation, is as described above with respect to the pointer mode.

Embodiments of the wearable headset system described herein may further comprise a software development kit (SDK) plug-in. In general, an SDK facilitates writing applications tailored to execute on a particular operating system (i.e., the operating system that is associated with the SDK, e.g., Microsoft Windows 10 or Android). The SDK plug-in of the described embodiments facilitates the integration of external wirelessly available resources (referred to herein as "wireless resources," e.g., software, AI modules, deep learning algorithms, etc.) into the wearable headset system processing entities, so that the wearable headset system can leverage the capabilities of the external resources to satisfy various requirements of the headset user.

The SDK plug-in essentially appends a series of available options onto the original SDK associated with a particular operating system. Based on those options, an application writer can integrate specific, unique features into an application being written. Head tracking capability, to control screens or enlarge/reduce screens, is one example feature which may be integrated into an application through the plug in. The SDK plug-in also allows a programmer to create an application that may access external wireless resources as described above. The SDK plug-in may be used by a programmer to generate an OS-based (Android or Windows 10) application, which leverages various available outside resources to do the things that a user wants/needs to do. The plug-in may comprise specific coding that enables the application to search for, access and utilize the outside resources to provide capabilities that extend beyond what is explicitly written in the application. By searching for and using the external resources to satisfy a need, the application can effectively morph on the fly to do what you want.

An example plug-in, and associated documentation for use with an Android operating system, is included in Appendix A. The corresponding plug in for Windows 10 is substantially the same as the plug-in shown in Appendix A, except for the coding used to interface to the specific operating system.

The SDK plug-in provides the application programmer with information about how to ask for and utilize external wireless services (resources). The SDK enables the programmer to list out the possible services that could be used to satisfy certain requirements. The processing entity of the WHS is a shell that provides services such as speech, head gestures, intertwined ability to reach into other wireless applications. The application generated through the SDK plug-in runs underneath the WHS processing entity. The application defines how to ask for the external resources, and provides commands you would give that would enable you to get this information, and it would provide you with the ability to define how the information is laid down after you receive it.

Applications written through the SDK plug-in of the described embodiments operate as sub-applications to WHS processing entity. The applications adopt the speech, the speech architecture, the parameters, et al., of the underlying WHS processing entity. Application may then recognize when external wireless resources are available, and to hierarchically draw upon the resources as needed, based on what the system is required to do.

A user of the WHS described herein may be presented with an input field for entering alpha-numeric information. In a hands-free mode, the described embodiments of the WHS may enable the user to select the input field using head gestures and/or voice commands (e.g., "insert cursor"). Either automatically upon selection of the input field, or upon a specific action by the user (e.g., voice command, head or hand gesture, etc.), an example embodiment of the WHS may provide the user with a virtual keyboard presented in the user's field of view. Using head gestures and/or voice commands, the user may select alpha-numeric characters from the virtual keyboard until the input field has been completed.

In an alternative embodiment, the user may call for the virtual keyboard through a gesture and/or voice command, use the virtual keyboard as described above to generate an alpha-numeric phrase, then move the generated phrase to a desired location in the user's field of view (e.g., to an input field or a virtual display screen within the user's field of view).

The described embodiments may facilitate automatic scanning and evaluation of resources (e.g., software applications and artificial intelligence (AI) utilities) available to the wearable headset system, in response to queries and/or commands from the headset system user. The described embodiments may employ processing entities that determine if one or more of the available resources may be used to satisfy the queries/commands from the user. The described embodiments may thus "stitch" together a set of resources to accomplish actions required by the user, with minimal input from the user. The following are examples to illustrate the operation and the utility of the active wireless resource scanning of the described embodiments.

During use of the wearable headset system described herein, a user may perform a substantially long sequence of actions to interact with the ordinary capabilities of the wearable headset system. For example, consider a situation where a user A sends a user B an SMS message, at a time when user B is busy working with the headset, with one or more screens open. User B may get a visual and/or audible notification of the received SMS message from user A. User B may open the SMS message from user A, and select a text to speech utility so that the SMS message can be audibly spoken to user B, while user B continues to work.

In an example embodiment, given the same situation described above, user B may briefly glance at the received SMS message from user A, and utter a command such as "read it to me." So rather than user B needing to select a "reading" service and feed the SMS information to that service, as described above, a processing entity of the example embodiments evaluates available resources and determines that an appropriate resource (for example, Google) is available to facilitate text-to-speech task, then automatically feeds it to the appropriate resource. User B consequently hears the received SMS message merely as a result of the user saying "read it to me," with no further action required from user B.

Once the user B hears the text-to-speech representation of the SMS message, user B may say "respond," or utter a command that causes a response to be created. The described embodiment may then prompt user B to begin dictating a response, and receive the spoken response. The described embodiment may then convert the received response from speech to text, and automatically send the response to user A.

The described embodiment may identify other requirements that may be satisfied by available resources. In the above example, requirements such as text-to-speech conversion were described as being satisfied with available speech engines. If the incoming SMS message were written in a language that user B did not understand, the described embodiment may seek and identify a translation resource (e.g., Google Translate) to perform the translation of the received SMS content. Again, the processing entity of the described embodiment would identify which resources are currently available to the wearable headset system, according to the current location of the system.

In another example, user A may send an email to user B. User B, while working on an unrelated task (e.g., on one or more screens within the GUI of the headset system's microdisplay), may get a summary notification that an email has been received. User B may voice the question, "what is the subject?" The described embodiment may, based on user B's question, provide an audible and/or visual notification of the email's subject field. If the subject is not important in the opinion of user B, user B may choose to ignore the email by stating "ignore" or other command conveying an intent to ignore the message. If the subject indicates relatively important or urgent information (e.g., "need to speak with you ASAP"), user B may elect to respond by stating "reply" (or other such command) to indicate an intent to send user A a response, and stating "I will contact you in an hour" or "I will respond to you this afternoon" as content for the reply. The processing entity of the described embodiment may automatically respond to the "reply" command by preparing a reply to user A's received email, in incorporating the user B's spoken response content into the reply. The processing entity of the example embodiment may also automatically cause the calendar utility of user B's mobile device to create a reminder entry at an appropriate time (i.e., in one hour or later in the afternoon, depending on the specific reply) to carry out an appropriate action (e.g., contact user A), based on user B's response.

The example embodiment may select a specific resource for a given situation based on the resources available in the user's current location. In the United States, for example, the embodiment may select Google as the specific resource, while in other countries a different, local resource may be available and consequently selected.

As described above with respect to active wireless resource scanning, certain wireless resources may be available to the user of the WHS, depending on various factors (e.g., user's location, time of day, etc.). Embodiments of the WHS described herein may provide a user with an option of automatic or manual selection of the available resources.

The WHS may interpret user input (e.g., a voice command or head/hand gesture) to set one of an automatic selection mode and a manual selection mode.

As described above, embodiments of a WHS may scan for, access and utilize available wireless resources to perform actions required on an "on-the-fly" basis. In some situations, the WHS may be required to actively communicate with the resources to set up access to such resources. Resources such as Dictation, Speech to Text, Text to Speech, Translation, along with access to Cloud resources, Internet, specific networks, etc., may require at least some handshaking to utilize the resources and allow information to flow. Embodiments of the WHS may perform such negotiation, interfacing and activation automatically upon a determination that the resource(s) is required to perform a desired task.

As described above, embodiments of a WHS may scan for, access and utilize available wireless resources to perform actions required on an "on-the-fly" basis. Certain types of users of the WHS may require specific access to environmental data (e.g., geo-location, temperature, weather conditions, time of day, seasonal conditions) to perform their jobs. Such users may include EMTs, First Responders, Medical Resource Providers, service station workers and travel rescue services, among others). Further, these specialized users may require particular mobile resources based on the identified environmental conditions. The described embodiments of a WHS may, upon scanning for available wireless resources, further evaluate the available wireless resources as a function of one or more environmental conditions. The specific environmental conditions may be programmed into the WHS application parameters when the application is created, or the specific environmental conditions may be selected by the WHS user by voice input, hands-free selection from a virtual menu displayed by the WHS on the user's display or microdisplay, or by another selection technique available to the user.

The described embodiments of the WHS may provide various types of hands-free help to the WHS user. In one embodiment, a global help may be available to the WHS user in response to a voice query or through one of the gesture based user input techniques described herein. The global help is independent of specific contemporaneous activities of the user.

In another embodiment, an application-specific hands-free help is available to the user. Application specific help queries are evaluated according to a particular application being contemporaneously used by the user. For example, while the user is using a WHS camera (i.e., while in camera mode), a request for help may initially cause a summary list of camera use categories from which the user may choose for additional operational details.

Embodiments of the WHS may provide a virtual video conferencing (VVC) facility to the WHS user. The VVC facility may allow a user to conduct bi-directional video and audio communication between the user and one or more other parties. The video interface may be presented to the user as a virtual screen within the field of view of the users microdisplay. The video interface may be subject to a camera zoom function (e.g., zoom level 1 through zoom level 10) controlled by voice commands and/or by head gestures.

Some embodiments of the WHS VVC facility may provide bi-directional annotation capabilities within the video conference. Annotations may be accomplished using head gestures or by accessing the touch screen of the host device associated with the WHS. An image gallery for such annotations may be available to the user, along with zoom/ magnification capability (as described elsewhere herein), which allows the user to enlarge the images within the user's field of view, by either voice commands, gestures or both. The WHS VVC facility may provide the user with a "picture-in-picture" arrangement, so that the user can see the portion of the overall image that is being expanded (i.e., a first box representing the complete image and a smaller box within the first box representing the expanded portion).

Embodiments of the WHS described herein present a graphical user interface (GUI) to the user within the field of view of the user's display/microdisplay. The GUI of the WHS may be agnostic to the particular operating system of the associated host device, i.e., the GUI appears and operates substantially the same regardless of the particular operating system used by the host device.

Embodiments of the WHS described herein may implement the functionality of a barcode reader. An imager (e.g., a camera) may be used to capture a bar code, a QR code, or other such optical coding protocol. The captured image may be processed according to the appropriate optical protocol to interpret the captured bar code (or other optical protocol) symbol(s).

Figure 1A:
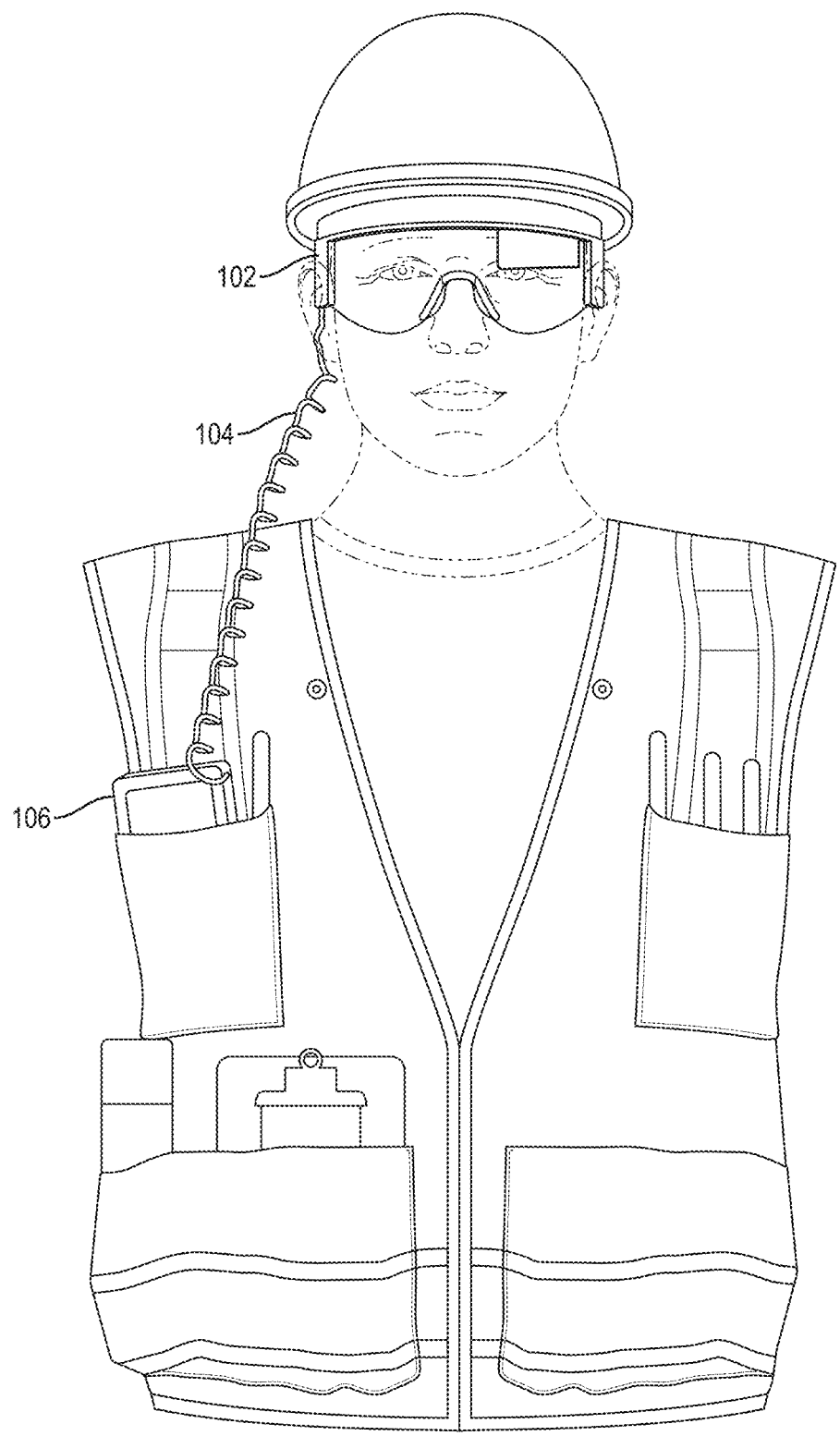
FIG. 1A illustrates a user wearing an WHS according to the invention.
Figure 1B:
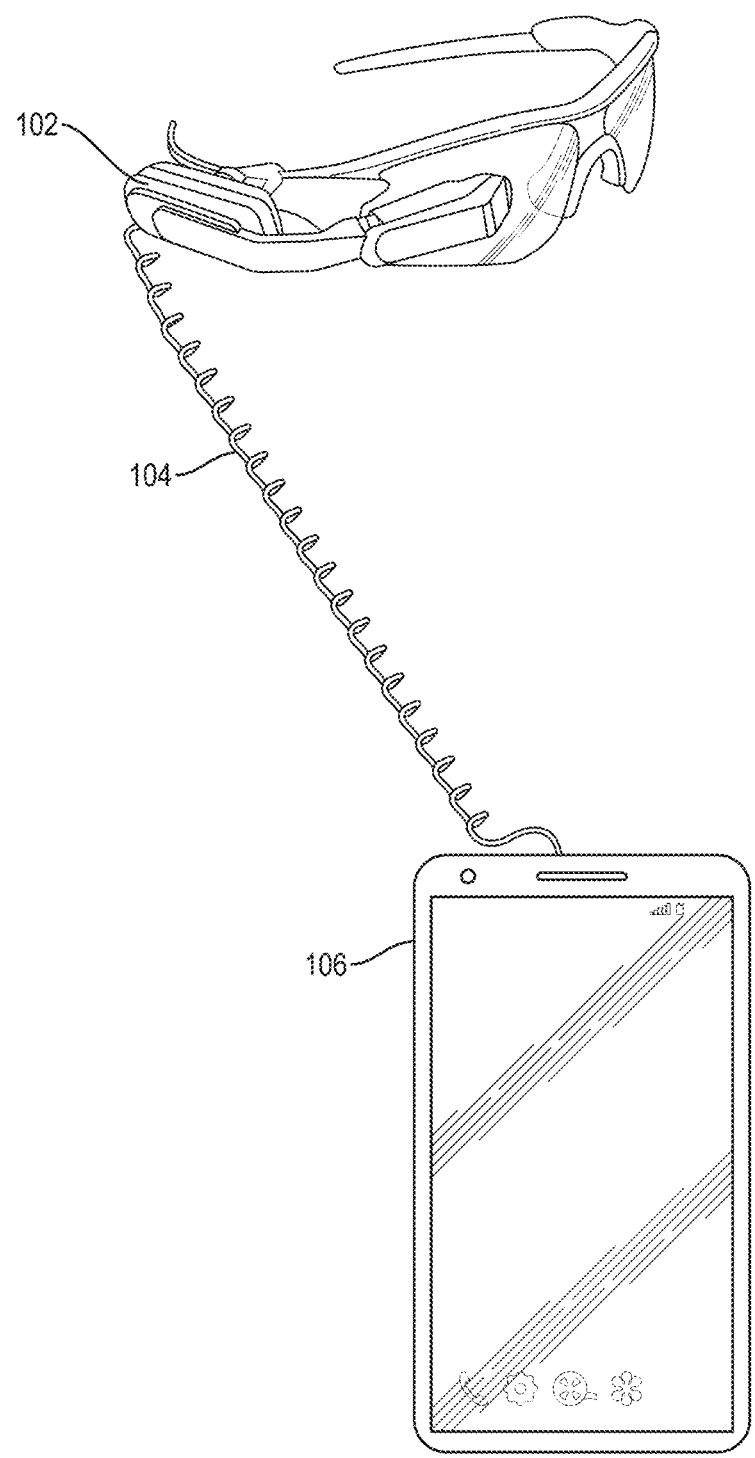
FIG. 1B shows the WHS of FIG. 1A alone, apart from a user, according to the invention.

The connection between the WHS and the host device may include a high bandwidth interface 104, as depicted in FIGS. 1A and 1B. Example embodiments of the high bandwidth interface 104 may comprise a USB 3.X (where X is an integer) or newer USB standard cable using USB Type C connectors or Type C connector adapter. Other high bandwidth interface implementations (connectors and conveyance media) known in the art, capable of conveying audio data and visual data, may also be used. In some embodiments, the WHS may comprise a video data port, for example a Video Electronics Standards Association (VESA) DisplayPort, for receiving or conveying video data. For example, the video data port may be used to provide data from a constituent image sensor to an external high-resolution video monitor. Alternatively, the video display port may be used to convey video data from the host device to the WHS.

In one example embodiment, communications from the host device to the WHS headset may be accomplished using the DisplayPort interface, and communications from the WHS headset may be accomplished using the USB 3.X interface.

The described embodiments of a WHS may present visual information to the user through virtual screens instantiated on a microdisplay. Through head gestures and/or voice commands, the user can virtually place the screen(s) anywhere about him (e.g., 360 degrees azimuth about the user, and 180 degrees elevation about the user, such that from the user's perspective, the user appears to be operating within a sphere, and the virtual screens may be instantiated anywhere on the interior surface of the sphere).

For example, the user can place a first screen directly in front of him, another behind him, and another at his feet. The user can the view the different screens by moving his head to look in those respective directions. The number of screens viewable by the user is only limited by the bandwidth of the link between the headset and the host device.

For the described embodiments, virtual screens arranged out of view do not consume display power resources, since the user's microdisplay does not actively instantiate those virtual displays when the user's head is not directed toward them.

As an example, suppose that a user is working on a task, and the user wants to open and view a portable document format (PDF) document. Suppose the user does not want to have to squint to see a particular item or region in the PDF document. The user can blow up (i.e., expand) the virtual screen (through gesture, voice command or both) to view the particular thing the user cares about. The user can then go to a different document/video, etc., on a different virtual screen. The user may have multiple screens open, but may only view one particular thing, on one particular screen at a time. In another embodiment, the user may desire to view two (or more) virtual screens at the same time. To view two screens simultaneously, the user may instantiate two virtual screens then manipulate them both (through gestures, voice commands or both) into the same field of view.

In general, the described embodiments of a WHS may provide the user with the ability to bring up different images, or outputs of two or more different applications available virtually on the user's display, just by slight turning the user's head to see the virtual display.

The described embodiments of the WHS provides the user with the ability to interface with one of many apps open, without interference between the open apps. Virtual displays associated with each of the apps can be selectively accessed by the user to hop back and forth between the available active apps, similar to the alternating use of apps on an ordinary desktop.

The described embodiments of the WHS provides the user with the ability to activate a light source on the WHS headset, the WHS host device, or both, through a voice command, by a head gesture, or both.

Figure 6:
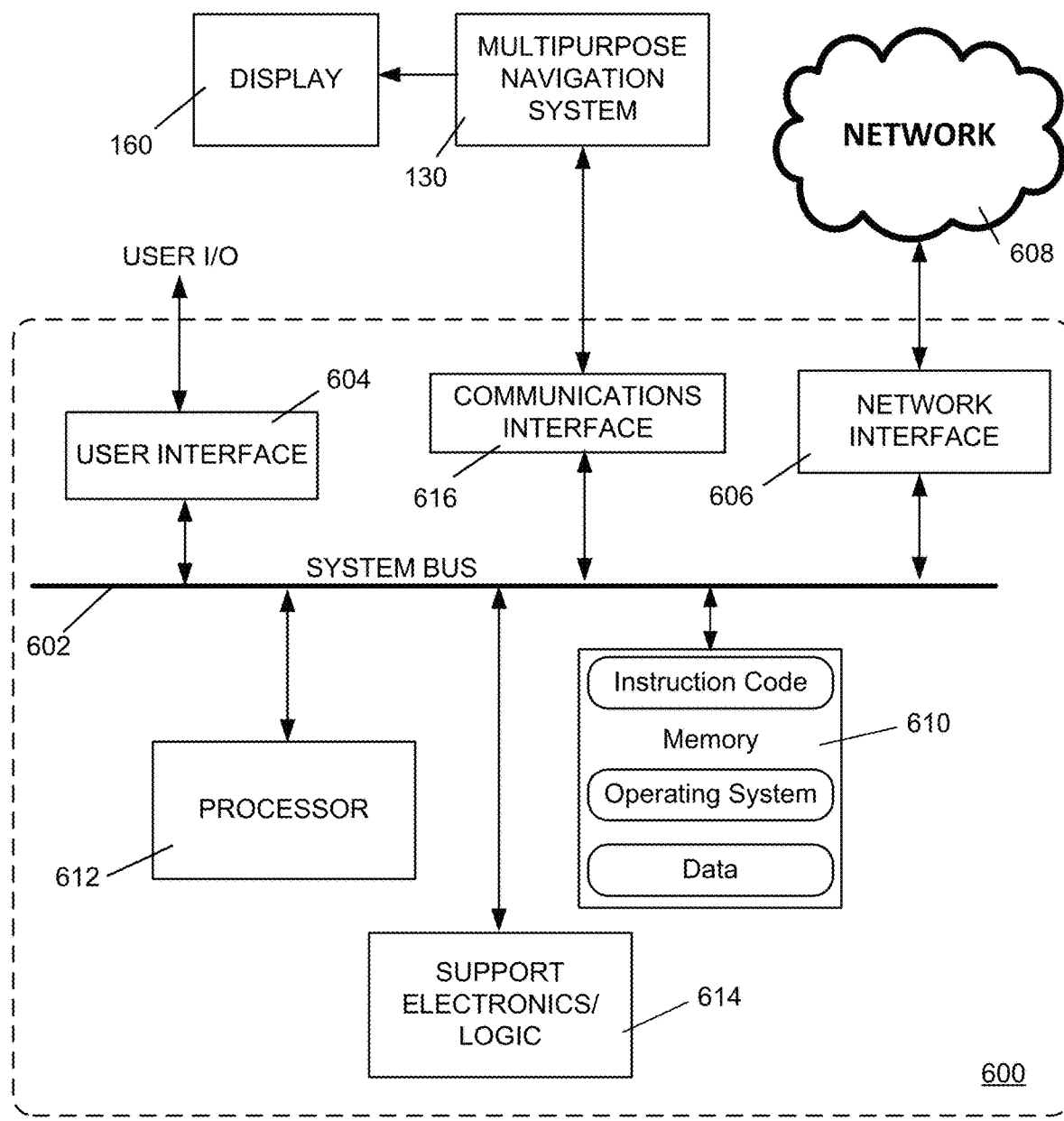
FIG. 6 shows a diagram of an example internal structure of a processing system that may be used to implement one or more of the embodiments herein.

FIG. 6 is a diagram of an example internal structure of a processing system 600 that may be used to implement one or more of the embodiments herein. Each processing system 600 contains a system bus 602, where a bus is a set of hardware lines used for data transfer among the components of a computer or processing system. The system bus 602 is essentially a shared conduit that connects different components of a processing system (e.g., processor, disk storage, memory, input/output ports, network ports, etc.) that enables the transfer of information between the components.

Attached to the system bus 602 is a user I/O device interface 604 for connecting various input and output devices (e.g., keyboard, mouse, displays, printers, speakers, etc.) to the processing system 600. A network interface 606 allows the computer to connect to various other devices attached to a network 608. Memory 610 provides volatile and non-volatile storage for information such as computer software instructions used to implement one or more of the embodiments of the present invention described herein, for data generated internally and for data received from sources external to the processing system 600.

A central processor unit 612 is also attached to the system bus 602 and provides for the execution of computer instructions stored in memory 610. The system may also include support electronics/logic 614, and a communications interface 616. The communications interface may implement the interface 250 as described with respect to FIG. 3.

In one embodiment, the information stored in memory 610 may comprise a computer program product, such that the memory 610 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

Figure 7:
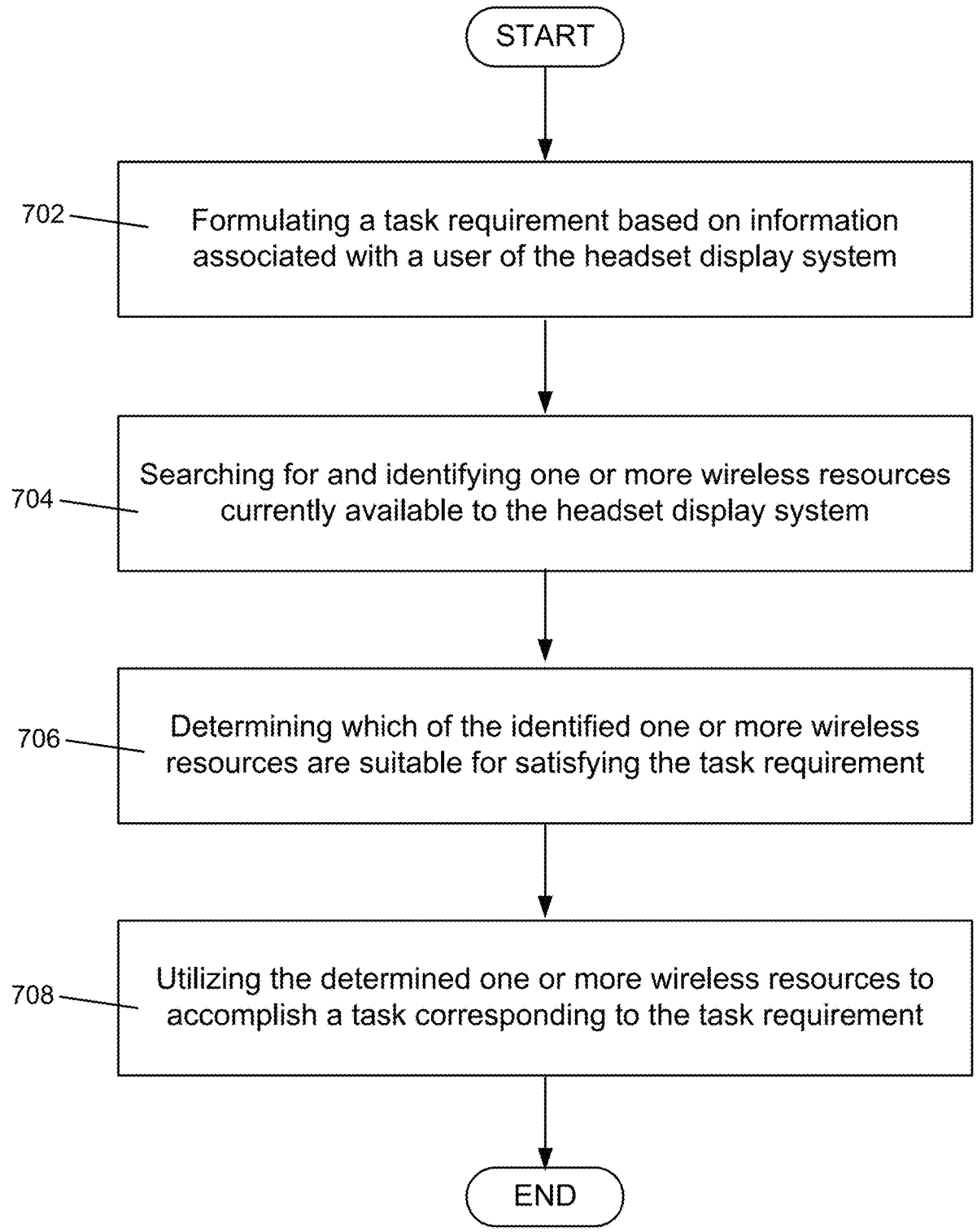
FIG. 7 illustrates an example embodiment of a method of identifying and utilizing external resources according to the invention.

FIG. 7 illustrates an example embodiment of a method of identifying and utilizing external resources according to the invention. The method comprises formulating 702 a task requirement based on information associated with a user of the headset display system, and searching for and identifying 704 one or more wireless resources currently available to the headset display system. The method may further comprise determining 706 which of the identified one or more wireless resources are suitable for satisfying the task requirement, and utilizing 708 the determined one or more wireless resources to accomplish a task corresponding to the task requirement.

While this invention has been particularly shown and described with references to example embodiments thereof, it will be understood by those skilled in the art that various changes in form and details may be made therein without departing from the scope of the invention encompassed by the appended claims.

What is claimed is:

1. A headset display system, comprising
a head mounted display comprising a microdisplay and one or more sensing components;
a remote host device configured to communicate with the head mounted display, the remote host device comprising:
a processor; and
a memory with computer code instructions stored thereon, the memory operatively coupled to the processor such that, when executed by the processor, the computer code instructions cause the headset display system to:
first, determine and register a need of a user based on a query and/or command from the user, the need being related to reducing actions, associated with the headset display system, that are performed by the user;
second, scan and evaluate one or more wireless resources currently available to the remote host device, the one or more wireless resources operate as sub-applications to the headset display system; and
third, determine which of the identified one or more wireless resources are suitable for satisfying the need of the user; and utilize the determined one or more wireless resources to accomplish a task corresponding to the need of the user.

2. The headset display system of claim 1, wherein the information associated with the user comprises information associated with one or more actions performed by the user.

3. The headset display system of claim 1, wherein the one or more wireless resources comprise at least one entity, external to the headset display system, that performs at least one of (i) generate a physical informational parameter, (ii) generate a process result, (iii) perform a data processing task, and/or (iv) access a communication and/or information storage resource.

4. The headset display system of claim 3, wherein the physical information parameter comprises one or more of (i) geo-location information, (ii) temperature information, (iii) weather condition information, (iv) time of day information, (v) seasonal conditions, and (vi) traffic condition information.

5. The headset display system of claim 3, wherein the process result, and/or a result of the data processing, comprises one or more of (i) dictation, (ii) speech to text conversion, (iii) text to speech conversion, and (iv) language translation.

6. The headset display system of claim 3, wherein the computer code instructions further cause the headset display system to implement combining two or more of the physical information parameter, process result and/or a result of the data processing task.

7. The headset display system of claim 1, wherein the determining is independent of other activities being undertaken by the user.

8. The headset display system of claim 1, wherein the determining depends on other activities being undertaken by the user.

9. The headset display system of claim 1, wherein the computer code instructions further cause the headset display system to implement a virtual video conferencing facility that presents video and audio information concerning one or more remote parties, to the user of the headset display system.

10. The headset display system of claim 9, wherein the virtual video conferencing facility is configured to facilitate annotations.

11. A method of identifying and utilizing external resources, comprising:
by a processor and a memory with computer code instructions stored thereon, the memory operatively coupled to the processor such that, when executed by the processor, the computer code instructions cause a headset display system to implement:
first, determining and registering a need of a user based on a query and/or a command from the user, the need being related to reducing actions, associated with the headset display system, that are performed by the user;
second, searching for and identifying one or more wireless resources currently available to the headset display system, the one or more wireless resources operate as sub-applications to the headset display system; and
third, determining which of the identified one or more wireless resources are suitable for satisfying the need of the user; and
utilizing the determined one or more wireless resources to accomplish a task corresponding to the need of the user.

12. The method of claim 11, wherein the information associated with the user comprises information associated with one or more actions performed by the user.

13. The method of claim 11, wherein the one or more wireless resources comprise at least one entity, external to the headset display system, that performs at least one of (i) generate a physical informational parameter, (ii) generate a process result, (iii) perform a data processing task, and/or (iv) access a communication and/or information storage resource.

14. The method of claim 13, further comprising combining two or more of the physical information parameter, process result and/or a result of the data processing task.

15. The method of claim 11, wherein the determining is independent of other activities being undertaken by the user.

16. The method of claim 11, wherein the determining depends on other activities being undertaken by the user.

17. The method of claim 11, further comprising implementing a virtual video conferencing facility that presents video and audio information concerning one or more remote parties, to the user of the headset display system.

18. The method of claim 17, wherein the virtual video conferencing facility is configured to facilitate annotations.

19. A headset display system, comprising:
a head mounted display comprising a microdisplay and one or more sensing components;
a remote host device configured to communicate with the head mounted display, the remote host device comprising:
a processor; and
a memory with computer code instructions stored thereon, the computer code instructions generated by:
using a software development kit (SDK) facility associated with an operating system employed by the remote host device;
arranging the SDK to cooperate with an SDK plugin, the SDK plugin configured to facilitate access to at least one resource suitable for first determining, second registering, and third satisfying a need of a user based on a query and/or command from the user, the need being related to reducing actions, associated with the headset display system, that are performed by the user, the at least one resource operates as sub-applications to the headset display system.

20. The headset display system of claim 19, wherein the at least one resource comprises at least one entity, external to the headset display system, that performs at least one of (i) generate a physical informational parameter, (ii) generate a process result, (iii) perform a data processing task, and/or (iv) access a communication and/or information storage resource.

* * * * *